United States Patent [19]

Fabre

[11] Patent Number: 4,900,626

[45] Date of Patent: Feb. 13, 1990

[54] HOLLOW COMPOSITE FIBERS SELECTIVELY PERMEABLE TO WATER VAPOR

[75] Inventor: Albert Fabre, Venissieux, France

[73] Assignee: Rhone-Poulenc Recherches, Courbevoie, France

[21] Appl. No.: 79,298

[22] Filed: Jul. 28, 1987

[51] Int. Cl.$^4$ .................. D01D 39/08; D02G 3/00
[52] U.S. Cl. .................. 428/398; 210/500.23; 210/506; 428/376; 55/16; 55/68
[58] Field of Search ............ 428/398, 392, 393, 394, 428/391, 376; 210/500.23, 506, 500.22, 500.24; 55/16, 68

[56] References Cited

U.S. PATENT DOCUMENTS

| | | | |
|---|---|---|---|
| 3,871,950 | 3/1975 | Hashino et al. | 210/503 |
| 4,214,020 | 7/1980 | Ward et al. | 427/430.1 |
| 4,230,463 | 10/1980 | Henis et al. | 427/245 |
| 4,405,688 | 9/1983 | Lowery et al. | 428/398 |
| 4,670,341 | 6/1987 | Lundsager | 428/398 |
| 4,689,267 | 8/1987 | Takamizawa et al. | 428/395 |

FOREIGN PATENT DOCUMENTS

| | | |
|---|---|---|
| 2541586 | 2/1984 | France . |
| 2566003 | 6/1984 | France . |
| 2100181 | 12/1982 | United Kingdom . |
| 2134814 | 8/1984 | United Kingdom . |

Primary Examiner—Lorraine T. Kendell
Attorney, Agent, or Firm—Burns, Doane, Swecker & Mathis

[57] ABSTRACT

Selectively permeable, hollow composite fibers, well adapted for the dehumidification of air or carbon dioxide, are comprised of (a) an asymmetric, hollow, polymeric base fiber including both dense and porous component layers, and (b) a polymer layer coated onto the dense layer of said asymmetric hollow base fiber.

10 Claims, No Drawings

HOLLOW COMPOSITE FIBERS SELECTIVELY PERMEABLE TO WATER VAPOR

BACKGROUND OF THE INVENTION

Field of the Invention

The present invention relates to novel hollow fibers especially adapted for the dehumidification of air or carbon dioxide. The subject hollow fibers are also especially adapted for conforming impure air supplies to environmental, e.g., health and safety, standards, for example, air containing, in addition to water vapor, water-soluble volatile industrial solvents, such as dimethylformamide or N-methylpyrrolidone.

Serious need continues to exist in the industrial arts for effective and facile means for removing water vapor/carbon dioxide from the ambient atmosphere, to render the workplace safe and healthy and to otherwise condition the air within optimum limits (hygrometry).

SUMMARY OF THE INVENTION

Accordingly, a major object of the present invention is the provision of improved hollow composite fibers uniquely adapted to fulfill the aforesaid need.

Another object of this invention is the provision of hollow composite fibers that are readily produced on an industrial scale.

Yet another object of the present invention is the provision of hollow composite fibers especially adapted for use in the foregoing end applications, even while operating under slight pressure differential between the inside and outside of said hollow composite fibers.

Still another object of this invention is the provision of hollow composite fibers possessing large $H_2O$/air or $H_2O/CO_2$ selectivity factors, for example, on the order of 50 to 1,000, i.e., such that the permeability of the hollow composite fibers relative to water vapor is 50 to 1,000 times greater than the permeability of the same hollow composite fibers relative to $CO_2$ or air.

Another object of this invention is the provision of hollow composite fibers having a high water vapor permeability, between 200 and $5000 \times 10^{-5}$ cm$^3$/cm$^2$ s.cm Hg and preferably between 220 and $1,000 \times 10^{-5}$ cm$^3$/cm$^2$ s.cm Hg (cm$^3$ of water vapor per cm$^2$ of a membrane in the form of a hollow composite fiber, per second, for a pressure differential of 1 cm mercury).

A further object of the present invention is the provision of hollow composite fibers that may be used in the aforesaid applications by circulating the humid gas (or mixture of gases) to be treated in contact with the inner wall member of the hollow composite fiber, while the gas enriched in water vapor is collected on the external wall member of said hollow composite fiber.

Still another object of the present invention is the provision of hollow composite fibers useful in the foregoing applications, even under temperatures corresponding to ambient.

Briefly, the present invention features novel hollow composite fibers well adapted for the removal of water from air or carbon dioxide, and comprising:

(a) an asymmetric hollow polymeric fiber with no selectivity for the water vapor contained in air or in carbon dioxide, having an internal diameter of from 130 to 900 microns and an external diameter of from 450 to 1,500 microns, which asymmetric hollow fiber comprises:

(i) a porous layer comprised of interconnected cells, the largest dimensions of which being less than 125 microns and their average dimensions ranging from 0.5 to 20 microns, and with the volume of the said cells constituting from 30 to 70% of the total volume of the asymmetric hollow fiber; and (ii) a dense layer, the pore diameters of which being less than 0.05 micron and the thickness of which ranging from 0.1 to 1 micron; and (b) a polymer coating layer having a thickness of from 0.15 to 25 microns, said coating layer being coated onto the dense layer of the asymmetric hollow fiber; and with the proviso that said hollow composite fiber has a substantially higher permeability relative to water vapor than to air or carbon dioxide, but no selectivity for airborne oxygen and nitrogen.

DETAILED DESCRIPTION OF THE PREFERRED EMBODIMENTS OF THE INVENTION

More particularly according to the present invention, the asymmetric hollow fiber substrates (supporting the coating layer) may comprise any of a number of different polymers.

Exemplary of such polymers, the following are representative:

(1) fluorinated polymers, such as, for example, poly(-vinylidene fluoride), polychlorotrifluoroethylene, copolymers of dichlorodifluoroethylene and chlorotrifluoroethylene, and the like;

(2) polysulfones, such as, for example, aromatic polysulfones, polyarylethersulfones as described in French Patent No. 1,407,301, the polyether sulfones marketed by Union Carbide under the trademarks UDEL 1700 or UDEL 3500, the sulfonated polysulfones described in U.S. Pat. No. 3,709,841 assigned to Rhone-Poulenc, the mixtures of polysulfones and sulfonated polysulfones described in U.S. Pat. No. 4,207,182 also assigned to Rhone-Poulenc, etc.;

(3) polyarylethers, for example, those marketed by Union Carbide under the trademark PKHH;

(4) cellulose esters, such as, for example, cellulose diacetate, cellulose triacetate and mixtures thereof;

(5) polymers based on acrylonitrile, as well as copolymers of acrylonitrile and mixtures thereof, such as, for example, the copolymer of acrylonitrile, methyl methacrylate and sodium methallylsulfonate, the copolymers of acrylonitrile and sodium methallylsulfonate, together with mixtures of anionic and cationic polymers, such as those described, for example, in French Patent No. 2,144,922 assigned to Rhone-Poulenc;

(6) polyvinyltriorganosilanes, such as those described in French Patent No. 2,082,095, for example, polyvinyltrimethylsilane, as well as the copolymers thereof, such as, for example, copolymers of vinyltrimethylsilane with vinyldimethylethylsilane, vinyldimethylpropylsilane or vinyldimethylbutylsilane, or vinyldimethylphenylsilane, etc.

The asymmetric hollow fibers (supporting the coating layer) are advantageously produced by known processes, in particular by preparing a solution typically comprising less than 30% by weight of the polymer, and then extruding such solution through an annular die. Representative solvents include dimethylformamide, dimethylsulfoxide, dimethylacetamide, N-methylpyrrolidone, and the like. After formation of the hollow fiber, internal or external coagulation is effected, either by injecting a coagulating liquid into the fiber, or by passing the fiber produced through a coagulating bath. The coagulating liquid may, for example, be water, optionally containing minor amounts of polar aprotic solvents, such as, for example, dimethylformamide or dimethylsulfoxide.

The asymmetric hollow fibers have an internal diameter of 130 to 900 microns and an external diameter of from 450 to 1,500 microns.

The subject asymmetric hollow fibers comprise both a porous layer and a dense layer, the latter defining either the external or internal wall member of the asymmetric hollow fibers. The dense layer has a thickness of from 0.1 to 1 micron and comprises pores having diameters of less than 0.05 micron. The porous layer is characterized by a plurality of intercommunicating cells, the largest dimensions of which being less than 125 microns, preferably less than 100 microns. These cells do not have a well defined geometrical form, and it is for this reason that the term "pore diameter" is not used relative thereto. The volume of the cells (porosity) constitutes from 30 to 70% of the total volume of the asymmetric hollow fiber and at least 80% of the cells have dimensions ranging from 0.5 to 20 microns. The asymmetric hollow fibers have no selectivity for the water vapor contained in air or in carbon dioxide, which indicates that the permeability of the asymmetric hollow fibers is the same for water vapor as for carbon dioxide and for air. In other words, the water/air or air/$CO_2$ separation factor is equal to 1.

The polymer layer coated onto the dense layer of the asymmetric hollow fiber has a thickness of from 0.15 to 25 microns, preferably from 0.5 to 15 microns.

Representative polymers suitable for the preparation of the coating layer include:

(1) polysiloxanes, such as, for example, polydimethylsiloxanes or polysiloxanes comprising alkyl and aryl substituents on the silicon atom;

(2) copolymers of dimethylsiloxane and phenylenesilane, such as those described in French Patent No. 2,414,519 assigned to Rhone-Poulenc;

(3) copolymers of dimethylsiloxane and polyurethane;

(4) organopolysiloxane/polycarbonate copolymers;

(5) polyvinylpyridines and copolymers thereof, for example, copolymers with styrene; and (6) polyvinyltriorganosilanes and copolymers thereof, such as those described above and suitable for use in the preparation of the asymmetric hollow fibers.

Concerning the coating layer, it should be noted that the thickness thereof has not been determined (by micrograms taken) by a scanning electron microscope. Indeed, examination of a transverse section of a hollow fiber, coated either internally or externally with polydimethylsiloxane and after metallization of the specimen, does not permit one to clearly distinguish the polydimethylsiloxane layer from the dense layer of the asymmetric hollow fiber. Therefore, it is preferred to refer to the weight of polydimethylsiloxane deposited per unit surface in this respect. Such weight is determined by weighing the fibers both before and after the coating, this value being expressed in the following examples in grams of polydimethylsiloxane deposited per m² of membrane surface. The density of polydimethylsiloxane being approximately 1, it is assumed that 1 g/m² deposited corresponds to a theoretical thickness of 1 micron.

In order to further illustrate the present invention and the advantages thereof, the following specific examples are given, it being understood that same are intended only as illustrative and in nowise limitative.

EXAMPLE 1:

280 g poly(vinylidene fluoride) (marketed by Atochem under the trademark FORAFLON 1000 HD) were dissolved in 720 g N-methylpyrrolidone.

The resulting solution was filtered through a diatrose WRJ filter marketed by LA ROCHETTE-CENPA and drawn into the shape of a hollow fiber by extruding it by means of a gear pump through an annular die having an external diameter of 0.85 mm and a center mandrel rod having an internal diameter of 0.15 mm and an external diameter of 0.250 mm. By means of the center mandrel rod of the die, a 25% by weight solution of N-methylpyrrolidone was injected, said solution enabling a perfectly round and uniform cross-section of the fiber to be maintained.

After passage through air at 23° C., for one-half second the hollow fiber was introduced into an external coagulating bath containing water, at 30° C.

The fiber was then washed with demineralized water, drawn to an extent of 1.18, then dried at 50° C. for 24 hr.

The asymmetric hollow fiber obtained in this manner had an external diameter of 0.558 mm and an internal diameter of 0.195 mm. the dense layer, on the outside of the fiber, had a thickness of 0.35 micron, while the porous layer under the dense layer comprised cells, the largest dimensions of which were less than 100 microns. The major portion of the cells, about 90% of them, had dimensions ranging from 1 to 20 microns.

The porosity (empty volume) of the hollow fiber was 60%. This asymmetric hollow fiber had no permeability for liquid water under a pressure differential of 2 bars and no selectivity for the water vapor contained in air, or for carbon dioxide.

The asymmetric hollow fiber was then coated on the outside (on the dense layer) by immersion in a 10% by weight solution, in cyclohexane, of polydimethylsiloxane (deemed the "silicone") marketed by Rhone-Poulenc under the trademark RHODORSIL CAF 3B. After vulcanizing at ambient temperature for one night, drying was carried out for 24 hr to eliminate the residual solvent. The weight of the silicone deposited in this manner was 9 g/cm², which corresponds to a theoretical thickness of the coating layer of 9 microns.

The product composite hollow fiber had a water vapor permeability of $260 \times 10^{-5}$ cm³/cm² s.cm Hg and a $H_2O$ vapor/air selectivity factor of 70.

The hollow fiber was cut into segments of hollow fibers having a length of 35 cm, which were assembled into a bundle of 55 fibers and placed into an external tubular enclosure. This was then sealed at both ends in known manner utilizing an epoxy/polyurethane adhesive.

The apparatus thus produced, designated a "permeator", comprised two tubes on the external enclosure enabling air to be circulated over the external walls of the composite hollow fibers and, accordingly, over the polydimethylsiloxane coating layer. It comprised two tubes in communicating relationship with the ends of the bundle and thus with the hollow fibers.

The permeator produced had a membrane surface area, calculated from the external diameter of the hollow fibers, of 0.03 m² and it was used to remove water vapor from air containing 21% oxygen relative to nitrogen. The operation was carried out as follows:

(i) the inlet air was introduced into the apparatus at 20° C. (having a hygrometric degree of 95%) by means of one of the lateral tubes located on the enclosure. It exited via the second tube (located on the enclosure), upon which a slide valve was placed, enabling creation of a loss of pressure in the circuit;

(ii) one of the tubes in communication with the ends of the bundle was closed by means of a slide valve, and, through the tube located at the other end of the bundle, by means of a vacuum pump, the absolute pressure inside the fibers was reduced to 15 millibars;

(iii) the pressure drop in the air circuit circulating on the outside of the fibers was regulated such that the absolute pressure on the outside of the fibers was 2 bars.

The air exiting from the permeator, after circulating in contact with the coating layer on the outside of the composite fibers (without passing therethrough), had a flow rate of 90 l/hr (liters per hour) and its hygrometric degree was 40%. The air exiting the permeator had the same oxygen content relative to nitrogen as the inlet air.

EXAMPLE 2:

The solution of Example 1 was extruded through an annular extruder having an external diameter of 1.93 mm, an internal diameter of the center mandrel rod of 0.5 mm, and an external diameter of 1.187 mm.

The internal coagulating liquid injected into the fiber was demineralized water. The bath through which the fiber passed was a 25% by weight aqueous solution of N-methylpyrrolidone.

After the same conditioning as in Example 1, the asymmetric hollow fiber produced had a dense internal layer and its other characteristics were identical with those obtained in Example 1, with the porous layer being inside of said hollow fiber.

The fiber had the following dimensions:
External diameter: 0.980 mm
Internal diameter: 0.612 mm
Wall thickness: 0.184 mm The hollow fiber was cut into segments of 35 cm which were placed, in the configuration of a rectilinear bundle of 50 fibers, into a tubular enclosure. The bundle was sealed at the ends of the enclosure with an epoxy/polyurethane adhesive as in Example 1, and the ends of the fibers of the bundle were opened by cutting. A solution of polydimethylsiloxane was then circulated inside the fibers to provide an internal coating layer. The polydimethylsiloxane solution was a 10% solution of siloxane in cyclohexane, marketed by Rhone-Poulenc under the trademark RHODORSIL CAF 3B. After vulcanization at ambient temperature for 24 hours, the fibers were dried by passing a flow of air at 50° inside the fibers for 24 hours.

The weight of the silicone deposited was 9 g/m$^2$, which corresponds to a coating layer having a theoretical thickness of 9 microns.

The composite hollow fiber obtained in this manner had a water vapor permeability of $260 \times 10^{-5}$ cm$^3$/cm$^2$ s.cm Hg and a H$_2$O (vapor)/air selectivity of 70.

The apparatus, the exchange surface area of which was calculated from the internal diameter of the composite fibers (having their coating layer inside the fibers) was 0.03 m$^2$, and it was then used to dehumidify air. The operation was carried out as follows:

Air was introduced at one of the ends of the bundle at a temperature of 20° C. It had a hygrometric degree of 95%. At the other end, a slide valve enabled control of the pressure applied to the inside of the fiber. Through lateral tubes located on the enclosure, an absolute pressure of 15 millibars was applied to the outside of the fibers by means of a vacuum pump. The pressure inside the fibers was controlled in a manner such that an absolute pressure of 2 bars was obtained. Under these conditions, the air flow circulating inside the fibers (without passing through them) was measured at the outlet of the permeator. A flow of 70 l/hr was obtained, and this output air had a hygrometric degree of 30%. The air exiting the permeator had the same O$_2$/N$_2$ ratio as the air entering the apparatus.

EXAMPLE 3:

A 21% by weight solution of cellulose polyacetate was prepared in a mixture of dichloromethane and N-methylpyrrolidone, in a ratio of 20/80 by weight, the acetyl index of which was 55% and its viscosity, measured at 23° C. in acetone at 12% P/P, was 297 centipascal per second. After filtering this solution on WRJ diatrose, it was extruded through an annular extruder die having an external diameter of 1.93 mm, a center mandrel rod with an internal diameter of 0.5 mm, and an external diameter of 1.187 mm. A mixture of water and N-methylpyrrolidone, 90/10 weight/weight, was injected into the center of the fiber at 10° C., via the mandrel. After passing through air for 0.3 second, the fiber was introduced into a coagulating bath of demineralized water at 5° C. Upon exiting the coagulating bath, the fiber was drawn by 27% in a water bath at 35° and then transferred over wash rollers, upon which the fiber was washed in demineralized water for 5 minutes, then wound and immersed in demineralized water for an additional washing o 24 hours.

After washing, the fiber was dried at 50° C. for 24 hours. The asymmetric hollow fiber obtained had:
An external diameter: 1.137 mm
An internal diameter: 0.715 mm
A wall thickness: 0.211 mm.

The dense layer on the outside of the fiber had a thickness of 0.15 micron. The porous layer comprised cells, the largest dimensions of which were 50 microns. The major portion, 90%, of these cells had dimensions of from 1 to 20 microns. The porosity (empty volume) of this asymmetric hollow fiber was 70%.

The fiber was then coated on its external surface with polydimethylsiloxane, by immersion in a 5% solution of RHODORSIL CAF 3B in cyclohexane. After vulcanization at ambient temperature for 8 hours, the fiber was dried at 60° for 24 hours. The weight of the silicone deposited was 4 g/m$^2$, which corresponds to a coating layer having a theoretical thickness of 4 microns.

The permeability of this hollow composite fiber relative to water vapor was $800 \times 10^{-5}$ cm$^3$/cm$^2$ s.cm Hg and the factor of H$_2$O/air selectivity factor was equal to 1,000. The oxygen and nitrogen permeabilities were equivalent and equal to $0.8 \times 10^{-5}$ cm$^3$/cm$^2$ s.cm Hg.

A bundle of 30 of such fibers was sealed into a permeator by means of an epoxy/polyurethane adhesive at both ends. The exchange surface area obtained, as calculated from the external surface area of the fibers, was 0.033 m$^2$.

The permeator was used, as in Example 1, to remove water vapor from air at 20° C., the hygrometric degree of which was 95%. For such purpose, the air to be treated was introduced through one of the lateral tubes of the permeator, said air having an oxygen content relative to nitrogen of 21%. The air, after having circulated in contact with the coating layer of the composite hollow fibers, exited the permeator via the second tube (situated laterally on the enclosure) equipped with a slide valve, which made it possible to establish a pressure inside the enclosure, i.e., outside the composite hollow fibers. By means of a slide valve, one of the tubes in communication with the ends of the bundle of hollow fibers was closed and the second end (of the bundle) was connected with a vacuum pump, which enabled establishment of an absolute pressure of 10 millibars inside the fibers. The pressure in the enclosure was controlled such as to provide a pressure equal to 2 bars in absolute value.

The flow of air circulating outside the fibers (without passing therethrough) was then measured at the outlet of the enclosure; this flow rate was 100 l/hr and the hygrometric degree of the air obtained was 40%. The oxygen content of this air (relative to nitrogen) was the same as the air introduced into the permeator.

EXAMPLE 4:

The cellulose diacetate solution of Example 3 was again used and extruded through the same extruder, but the conditions of coagulation were modified such that the dense layer of the asymmetric hollow fiber was maintained inside the fiber. During the extrusion, demineralized water was injected into the fiber at 5° C., then, after passing same through air for 0.3 second, the fiber was immersed in a bath at 10° C., of a mixture of water and N-methyl pyrrolidone (90/10 by weight).

The hollow fiber was subjected to a treatment identical to that of Example 3 and, after drying, it had the following characteristics:
  External diameter: 1.137 mm,
  Internal diameter: 0.715 mm.

This asymmetric hollow fiber exhibited, under the scanning electron microscope, a dense layer having a thickness of 0.15 micron on its internal wall. The porous layer comprised cells, the largest dimensions of which were 50 microns and 90% of which had dimensions of from 1 to 20 microns. The porosity of this fiber was 65%.

The asymmetric hollow fiber was cut into 35 cm segments and 50 of these segments were placed in a rectilinear bundle in a tubular enclosure (permeator). The bundle was sealed at both ends into the enclosure by means of an epoxy/urethane adhesive, as in the preceding examples. The ends of the fibers of the bundle were opened by cutting away a part of the adhesive mass, after setting.

A 10% solution of polydimethylsiloxane in cyclohexane was then circulated inside the fibers in order to obtain an internal coating layer. Polydimethylsiloxane is a silicone resin marketed by Rhone-Poulenc under the trademark RHODORSIL CAF 3B. After vulcanization for 24 hours at ambient temperature, the fibers were dried by circulating therein a flow of air at 50° C. for 25 hours. The weight of the silicone deposited was 6 g/m$^2$, which corresponds to a theoretical coating layer of 6 microns.

The composite hollow fiber produced had a permeability relative to water vapor of $500 \times 10^{-5}$ cm$^3$/cm$^2$ s.cm Hg and a H$_2$O/air selectivity factor of 560.

This apparatus, the exchange surface area of which was calculated from the internal diameter of the fibers and determined to be 0.035 m$^2$, was used to dehydrate air.

Air having a hygrometric degree of 95% was introduced inside the fibers at 20° C. through one of the ends of the bundle. At the other end of the apparatus, a slide valve placed in the outlet tube made it possible to establish a controlled pressure inside the fibers. Through the lateral tubes placed on the enclosure, an absolute pressure of 10 millibars was applied to the outside of the fibers by means of a vacuum pump. The pressure inside the fibers was regulated to maintain an absolute pressure of 2 bars.

The flow rate of the air circulated inside the fibers and exiting from the bundle was 100 l/hr and its hygrometric degree was 35%. The O$_2$/N$_2$ ratio of the air exiting the bundle was the same as that of the inlet air.

EXAMPLE 5:

A permeator identical to that of Example 4 was used to extract water from carbon dioxide. For such purpose, at one of the ends of the bundle, inside the composite fibers, a flow of carbon dioxide having a hygrometric degree of 98% was introduced at 20° C. As in Example 4, the operation was carried out with an absolute pressure of 10 millibar on the outside of the fibers and an absolute pressure of 2 bars therewithin. After 2 hours of operation, the flow of carbon dioxide at the outlet of the permeator, i.e., the carbon dioxide (CO$_2$) gas exiting the hollow composite fibers at the other end of the bundle, was 80 l/hr and the hygrometric degree of the CO$_2$ obtained was 31.5%.

EXAMPLE 6:

A permeator identical to that used in Example 4 was utilized to extract water vapor and dimethylformamide (DMF) from air. For such purpose, a flow of air (charged with DMF vapors) was introduced at 20° C. at one of the ends of the bundle, into the composite fibers, said air having a hygrometric degree of 95% and containing 100 mg DMF per m$^3$. As in Example 4, the operation was carried out with an absolute pressure of 10 millibars outside the fibers and an absolute pressure of 2 bars therewithin. After 2 hours of operation, the flow of air at the outlet of the permeator, at 20° C., was 100 l/hr. The air collected, having been circulating inside the composite fibers, had a hygrometric degree of 30% and a DMF content of 25 mg/m$^3$. The O$_2$/N$_2$ ratio of said air, which was partially dehumidified and rendered more healthful, was the same as that of the inlet air to be treated, entering the bundle at the other end of the bundle of composite fibers.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A hollow composite fiber which comprises:
   (a) an asymmetric, hollow, polymeric fiber comprising poly(vinylidene fluoride), sulfonated polysulfone, polysulfone, cellulose ester, or mixtures thereof having no selectivity of the water vapor in air or carbon dioxide, and having an inside diameter of from 130 to 900 microns and an outside diameter of from 450 to 1,500 microns, said asymmetric hollow fiber comprising (i) a porous layer including a plurality of intercommunicating cells, the largest dimensions of which are less than 125 microns, with at least 80% of said cells having dimensions ranging from 0.5 to 20 microns and the pore volume of said cells constituting from 30 to 70% of the total volume of said asymmetric hollow fiber and (ii) a dense layer defining either the external or internal wall member of the asymmetric hollow fibers having pores, the diameters of which are less than 0.5 micron and the thickness thereof ranging from 0.1 to 1 micron;

(b) a polymer layer coated onto the dense layer (ii) of said asymmetric hollow fiber; and (c) said hollow composite layer having a permeability relative to water vapor greater than to air or carbon dioxide and, thus, essentially no selectivity for airborne oxygen or to nitrogen.

2. The hollow composite fiber as defined by claim 1, said polymer layer coating (b) comprising the external wall surface of said asymmetric hollow fiber (a).

3. The hollow composite fiber as defined by claim 1, said polymer layer coating (b) comprising the internal wall surface of said asymmetric hollow fiber (a).

4. The hollow composite fiber as defined by claim 1, said polymer coating layer (b) comprising a polysiloxane or polymer comprised of at least 60% of siloxane recurring units.

5. The hollow composite fiber as defined by claim 1, having a water/air separation factor of from 50 to 1,000.

6. The hollow composite fiber as defined in claim 1, having a water vapor permeability of from 200 to $5,000 \times 10^{-5}$ cm$^3$/cm$^2$ s.cm Hg.

7. The hollow composite fiber as defined by claim 1, said asymmetric hollow fiber (a) comprising a poly(vinylidene fluoride) impermeable to liquid water under a pressure differential of 2 bars.

8. The hollow composite fiber as defined by claim 1, having an essentially round and uniform cross-section.

9. The hollow composite fiber of claim 1 wherein the cellulose ester is cellulose diacetate or cellulose triacetate or mixtures thereof.

10. The hollow composite fiber of claim 1 wherein the asymmetric hollow fiber comprises cellulose diacetate or cellulose triacetate or mixtures thereof.

* * * * *